United States Patent
Zhong (10) Patent No.: US 8,350,966 B2
(45) Date of Patent: Jan. 8, 2013

(54) METHOD AND SYSTEM FOR MOTION COMPENSATED NOISE LEVEL DETECTION AND MEASUREMENT

(75) Inventor: Sheng Zhong, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 838 days.

(21) Appl. No.: 12/480,364

(22) Filed: Jun. 8, 2009

(65) Prior Publication Data

US 2010/0309378 A1    Dec. 9, 2010

(51) Int. Cl.
*H04N 5/00* (2011.01)
(52) U.S. Cl. ................................ 348/607
(58) Field of Classification Search ........... 348/169, 348/607, 701; 382/100, 166; 375/240.1
See application file for complete search history.

(56) References Cited

U.S. PATENT DOCUMENTS

| 5,212,742 A | * | 5/1993 | Normile et al. | 382/166 |
| 7,916,784 B2 | * | 3/2011 | MacInnis et al. | 375/240.1 |
| 2005/0031156 A1 | * | 2/2005 | Rhoads | 382/100 |
| 2008/0062327 A1 | * | 3/2008 | MacInnis et al. | 348/701 |

* cited by examiner

*Primary Examiner* — Nasser Goodarzi
*Assistant Examiner* — An Nguyen
(74) *Attorney, Agent, or Firm* — Thomas Horstemeyer, LLP (57) ABSTRACT

Two consecutive interlaced video pictures of the same polarity or two consecutive progressive video pictures are read by a video processing system. The video pictures may comprise a current picture and a noise reduced reference picture. Motion and/or motion vectors may be estimated between the current and reference pictures by a motion compensated noise detector and/or a motion compensated temporal filter. A noise level sample may be determined for a pixel in the current picture based on a window of pixel data from the current picture and a window of motion compensated pixel data from the reference picture. One or more of a moving edge gradient value, a moving content value and a determined range of noise level values may be utilized to determine a valid noise sample. Noise level samples may be accumulated and a noise level may be determined for the current picture.

18 Claims, 6 Drawing Sheets

METHOD AND SYSTEM FOR MOTION COMPENSATED NOISE LEVEL DETECTION AND MEASUREMENT

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for motion compensated noise level detection and measurement.

BACKGROUND OF THE INVENTION

Video data may be received through broadcast, cable, satellite, Internet, and video discs. Digital video may be corrupted by noise, which may include analog noise and/or coding artifacts, for example. To improve quality of a video image, noise reduction may be utilized. Various noise filters have been utilized in video communication systems such as set top boxes. However, inaccurate noise characterization, especially during scenes with motion, may result in artifacts caused by the filtering, which are more visually detrimental than the original noise. Analog video may be received through broadcast, cable, and VCRs. The reception is often corrupted by noise.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for motion compensated noise level detection and measurement, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for motion compensated noise level detection and measurement. One or more processors and/or circuits in a video processing system may be utilized to read two consecutive same polarity video pictures that may comprise interlaced video pixel data and/or progressive video data. The two consecutive same polarity video pictures may comprise a current video picture and a noise reduced reference video picture. A noise level for pixel data in the current video picture may be determined based on the current video picture and motion compensated pixel data of the noise reduced reference video picture. A noise level for the current video picture may be determined based on the determined noise level for the pixel data from the current video picture. Motion and/or motion vectors may be estimated between the two consecutive same polarity video pictures. The motion estimation may be performed by a motion compensated noise detector and/or a motion compensated temporal filter, for example. Furthermore, for a plurality of pixels from the current video picture, a noise level sample may be determined. The noise level sample may be determined based on a window of pixel data from the current video picture and a window of pixel data from the motion compensated, noise reduced reference video picture. A valid noise sample for the current video picture may be determined based on one or more of a moving edge gradient value, a moving content value and a determined range of noise level values. Noise level samples may be accumulated for a plurality of pixels within the current video picture and/or a noise level may be determined for the current video picture.

Figure 1:
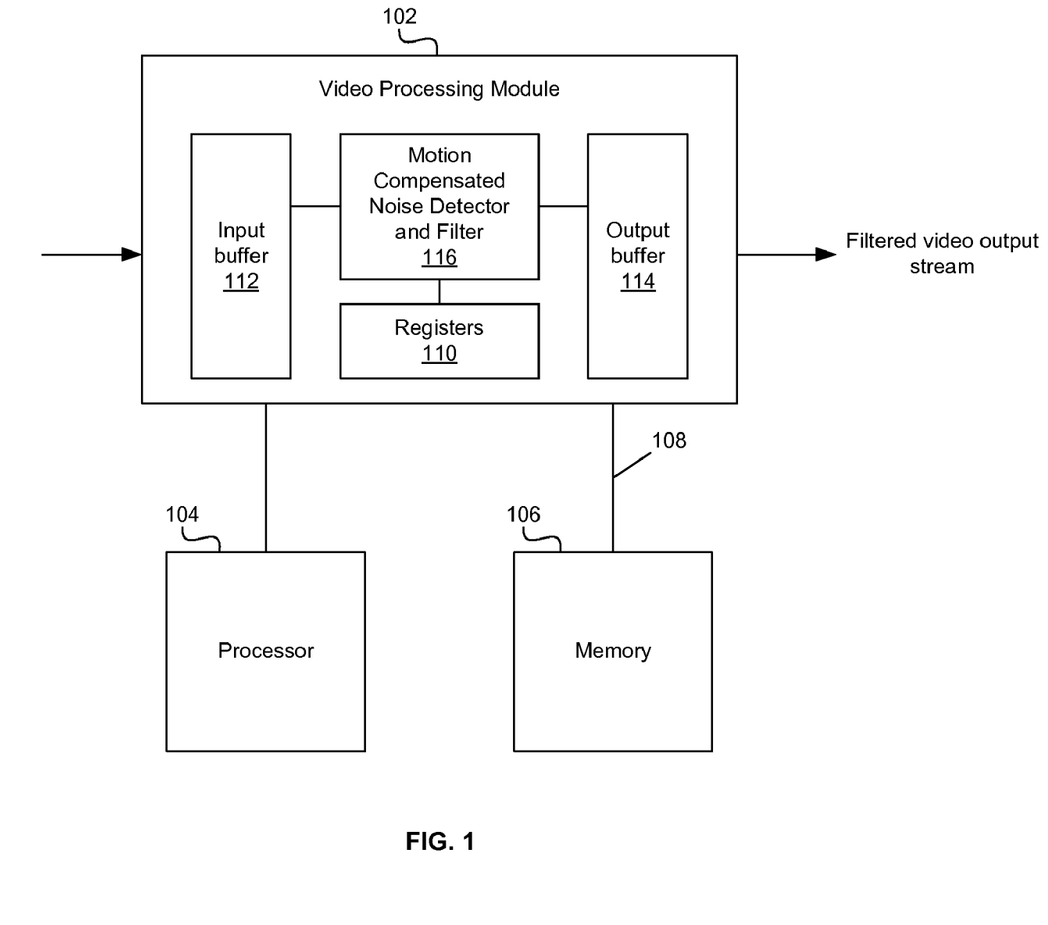
FIG. 1 is a block diagram of an exemplary motion compensation video processing system, in accordance with an embodiment of the invention.

FIG. 1 is a block diagram of an exemplary motion compensation video processing system, in accordance with an embodiment of the invention. Referring to FIG. 1, there is shown a video processing module 102, a processor 104, a memory 106, and a data/control bus 108. The video processing block 102 may comprise registers 110 and motion compensated (MC) noise detector and filter 116. In some instances, the video processing module 102 may also comprise an input buffer 112 and/or an output buffer 114. The video processing module 102 may comprise suitable logic, circuitry, and/or code that may be enabled to filter pixels in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing module 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing module 102 may be enabled to generate a filtered video output stream and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The motion compensated (MC) noise detector and filter 116 in the video processing module 102 may comprise suitable logic, circuitry, interface(s) and/or code that may be operable to determine an average noise level of a video picture wherein corrupted pixel samples may be eliminated from the determination. The determined average noise level for a video picture may be utilized to determine various parameters that may be utilized for filtering and/or processing the picture. The corrupted pixel samples may be determined based on motion compensation searching techniques, edge detection and content detection. The content detection techniques may be operable to detect DC shift or complex motion in a video picture, for example. The filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. The registers 110 in the video processing module 102 may comprise suitable logic, circuitry, interface(s) and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, interface(s) and/or code that may be enabled to process data and/or perform system control operations. The processor 104 may be enabled to control at least a portion of the operations of the video processing module 102. For example, the processor 104 may generate at least one signal to control the selection of the filtering mode in the video processing module 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108. The memory 106 may comprise suitable logic, circuitry, interface(s) and/or code that may be enabled to store information that may be utilized by the video processing module 102 to detect and/or reduce noise in the video input stream. The memory 106 may be enabled to store filter coefficients, threshold levels, and/or constants, for example, to be utilized by the video processing module 102.

In operation, the processor 104 may select a filtering mode of operation and may program the selected filtering mode into the registers 110 in the video processing module 102. Moreover, the processor 104 may program the appropriate values for the filter coefficients, threshold levels, and/or constants into the registers 110 in accordance with the selected filtering mode. The video processing module 102 may receive the video input stream and may filter pixels in a video picture in accordance with the selected filtering mode. In some instances, the video input stream may be stored in the input buffer 112 before processing. The video processing module 102 may be operable to detect noise levels in pictures utilizing motion estimation and motion compensation, edge detection and content detection. The detected noise levels may be utilized to determine parameters needed to perform the noise reduction filtering operation selected by the processor 104. The video processing module 102 may generate the filtered video output stream after performing the noise reduction filtering operation. In some instances, the filtered video output stream may be stored in the output buffer 114 before being transferred out of the video processing module 102.

Figure 2:
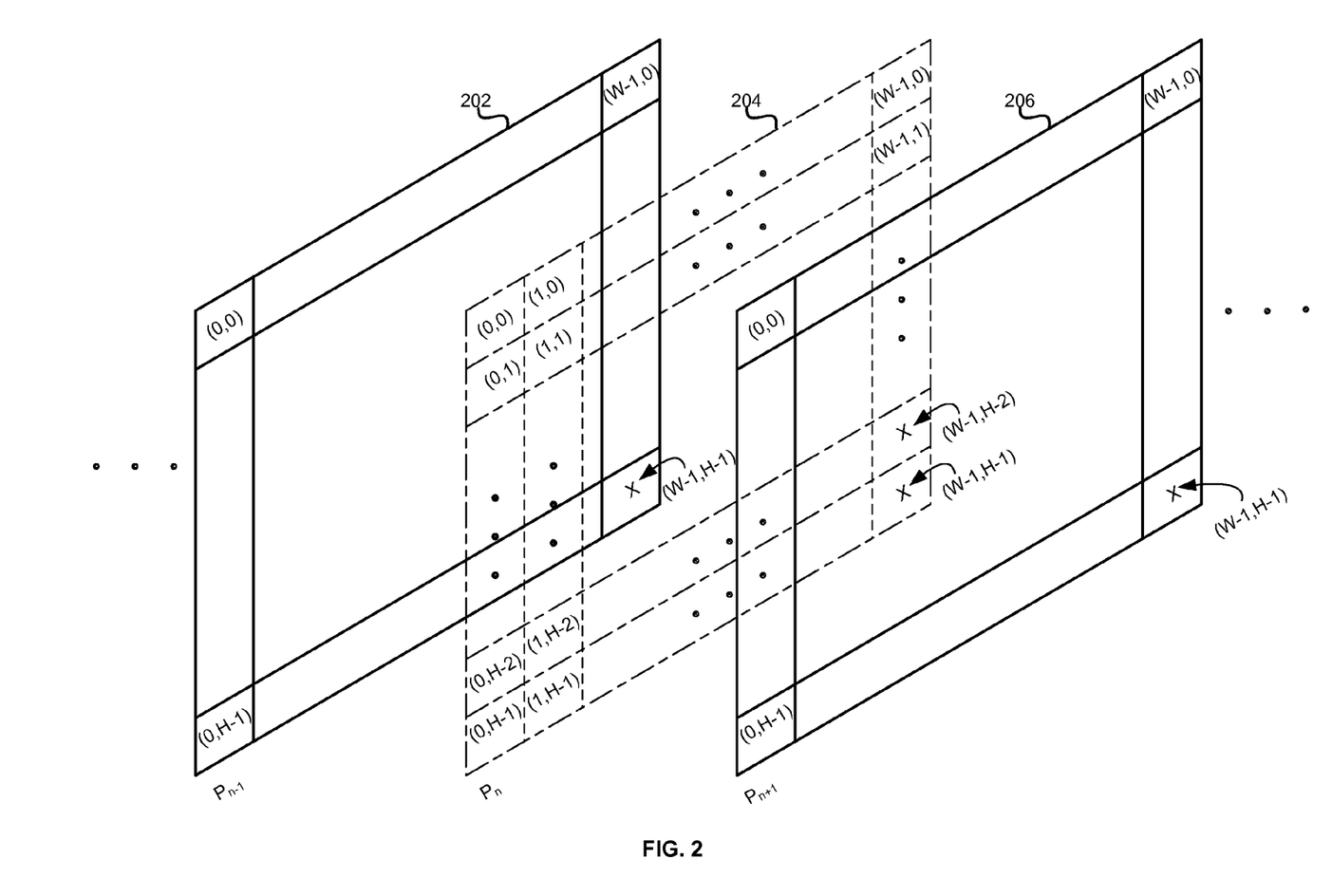
FIG. 2 is a diagram illustrating exemplary consecutive video pictures for motion compensated noise reduction operations, in accordance with an embodiment of the invention.

FIG. 2 is a diagram illustrating exemplary consecutive video pictures for motion compensated noise reduction operations, in accordance with an embodiment of the invention. Referring to FIG. 2, there is shown a current video picture 204, a previous video picture 202, and a next video picture 206. The current video picture 204 or $P_n$ may correspond to a current picture being processed by the video processing module 102 in FIG. 1. The previous video picture 202 or $P_{n-1}$ may correspond to an immediately previous picture to the current video picture 204. The next video picture 206 or $P_{n+1}$ may correspond to an immediately next picture to the current video picture 204. The previous video picture 202, the current video picture 204, and/or the next video picture 206 may be processed directly from the video input stream or after being buffered in the video processing module 102, for example. The current video picture 204, the previous video picture 206, and the next video picture 208 may comprise luma (Y) and/or chroma (Cb, Cr) information. In embodiments where video fields are utilized as pictures, the previous video picture 202 may refer to the previous field of the same parity as the current video picture 204, and the next video picture 206 may refer to the next field of the same parity as the current picture 204. The previous, current and next video fields of the same parity may be referred to as consecutive video pictures.

Pixels in consecutive video pictures are said to be collocated when they have the same pixel location within each specified picture. For example, . . . , $P_{n-1}(x,y)$, $P_n(x,y)$, $P_{n+1}(x,y)$, . . . , represents collocated pixels at the position (x,y) in the previous picture $P_{n-1}$, in the current picture $P_n$, and in the next picture $P_{n+1}$. Referring to FIG. 2, a pixel location (x,y) may represent a pixel location where x may equal 0, 1, . . . , W−1 and y may equal 0, 1, . . . , H−1, where W is the picture width and H is the picture height, for example.

Operations of the video processing module 102 in FIG. 1 need not be limited to the use of exemplary consecutive video pictures as illustrated in FIG. 2. For example, the video processing module 102 may perform filtering operations on consecutive video fields of the same polarity, that is, on consecutive top fields or consecutive bottom fields.

Figure 3:
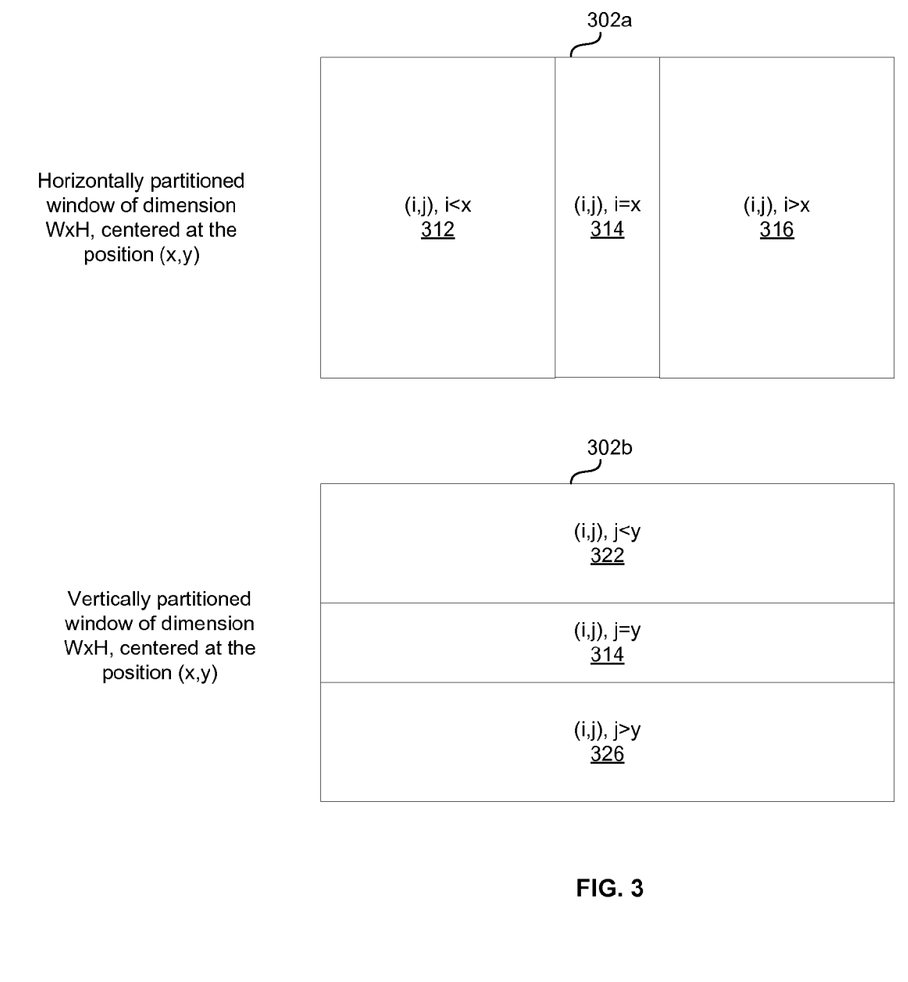
FIG. 3 is a block diagram illustrating a window of pixel data that is partitioned around a center pixel (x,y), according to an embodiment of the invention.

FIG. 3 is a block diagram illustrating a window of pixel data that is partitioned around a center pixel (x,y), according to an embodiment of the invention. Referring to FIG. 3, there is shown a window 302 that may be partitioned horizontally as shown in window 302a comprising a section of i less than x pixels 312, a section of i equals x pixels 314 and a section of i greater than x pixels 316. In addition, the window 302 may be partitioned vertically as shown in window 302b comprising a section of j less than y pixels 322, a section of j equals y pixels 324 and a section of j greater than y pixels 326.

The window 302 may comprise dimensions W×H comprising a width of W pixels and a height of H pixels where each pixel may be represented by (i, j). The window 302 may have center pixel (i=x, j=y) and may be partitioned into three sections horizontally comprising the section of i less than x pixels 312, the section of i equals x pixels 314 and the section of i greater than x pixels 316. The window 302 may be partitioned into three sections vertically comprising the section of j less than y pixels 322, the section of j equals y pixels 324 and the section of j greater than y pixels 326.

Figure 4:
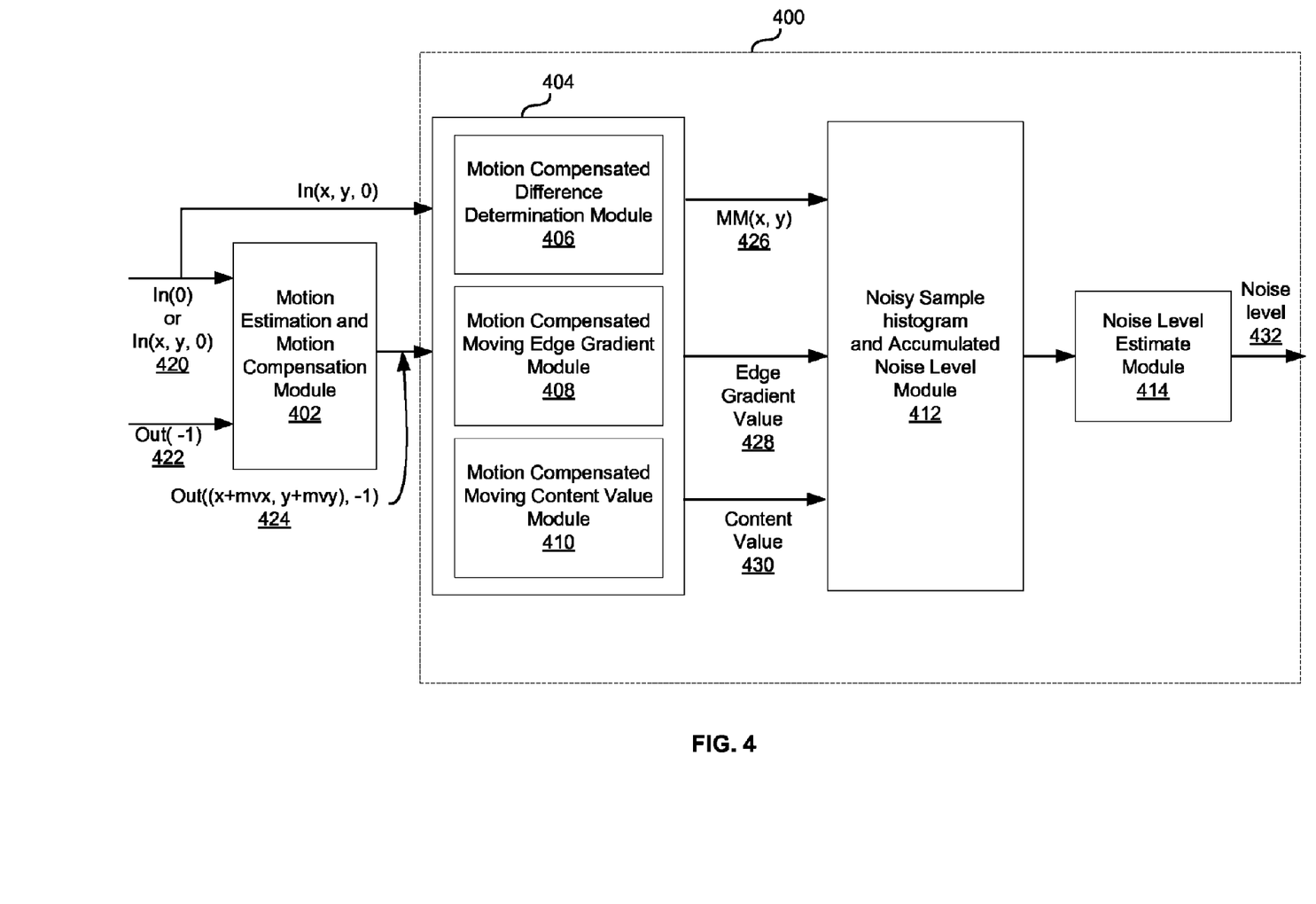
FIG. 4 is a block diagram illustrating a motion compensated noise detector, in accordance with an embodiment of the invention.

FIG. 4 is a block diagram illustrating a motion compensated noise detector, in accordance with an embodiment of the invention. Referring to FIG. 4 there is shown a motion estimation (ME) and motion compensation (MC) module 402 and a noise level determination system 400 that may comprise a motion compensated noise detector (MCND) 404, a noisy sample histogram (NSH) and accumulated noise level (ANL) module 412 and a noise level estimation module 414. The MCND 404 may comprise a motion compensated (MC) difference determination module 406, a motion compensated (MC) moving edge gradient module 408 and a motion compensated (MC) moving content value module 410. Also, there is shown the input and output information In(x, y, 0) 420, Out(−1) 422, Out(x+mvx, y+mvy, −1) 424, MM(x, y) 426, edge gradient value 428, content value 430 and noise level 432.

The motion estimation (ME) and motion compensation (MC) module 402 may comprise suitable logic, circuitry, interface(s) and/or code that may be operable to receive a portion of pixel data from a current video picture, for example, In(x, y, 0) 420 of a current video picture In(0) and a reference video picture, for example, Out(−1) 422 that may be a recursive feedback picture from a previous processing step. In this regard, the reference video picture or window, Out(−1) 422 may have been filtered or noise reduced such that random noise may have been removed from Out(−1) 422 pixel values. The ME and MC module 402 may determine motion vectors, for example, mvx and/or mvy, that may indicate a displacement of one or more pixels of the current picture In(x, y, 0) relative to the same or similar pixels in the reference video picture Out(−1) 422. The motion vector mvx may indicate the x component of the displacement and the motion vector mvy may indicate a y component of the displacement. The ME and MC module 402 may be operable to send a motion compensated window of pixel data Out(x+mvx, y+mvy, −1) 424 and/or pixel data from the current video picture In(x, y, 0) 420 to the MCND module 404. The motion and/or motion vector may be estimated and compensated at up to ¼ pel precision.

The ME and MC module 402 may be operable to handle pixel data of the current video picture In(x, y, 0) 420 and/or the previous output video picture Out(−1) 422 that may comprise interlaced fields of video of the same polarity and/or progressive video frames. With regard to interlaced video pictures, the ME and MC module 402 may be operable to estimate motion and/or motion vector that occurs between the two video pictures of the same polarity, for example, from a top field to a nearest top field or a bottom field to a nearest bottom field.

The ME and MC module 402 may utilize motion compensation searching techniques to estimate the motion and/or motion vector of pixilated imagery from one video picture to another video picture. For example, the ME and MC module 402 may search the reference picture Out(−1) 422 for pixilated imagery that may be identified in the current picture In(x, y, 0) 420. In this regard, the identified pixilated imagery may be located in a different position in the reference picture Out(−1) 422 than in the current picture In(x, y, 0) 420. The current video picture In(0) 420 and the reference video picture Out(−1) 422 may have the same polarity, for example, both may comprise top fields or both may comprise bottom fields, and may have a field in between them of an opposite polarity.

The ME and MC module 402 may determine the direction and/or degree of motion or displacement of the pixilated imagery in the reference video picture Out(−1) 422 relative to the current video picture In(x, y, 0) 420. The direction and/or degree of motion may be represented by motion vectors. In this regard, the ME and MC module 402 may determine the motion vectors by comparing a window of pixel data within a current video picture In(x, y, 0) that may comprise a window of pixel width (W) and height (H) centered at a pixel position (x,y), with a plurality of W×H windows centered at various pixel positions within a specified range in the reference video picture Out(−1) 422. The various pixel positions of the W×H window may have up to ¼ pixel precision, for example. If a match is found in the reference picture, the motion vectors may be determined based on the displacement of the search window at the position of the match. An exemplary search window may have the dimensions 5×7, for example. The ME and MC module 402 may output the matched window Out(x+mvx, y+mvy, −1) 424 with dimensions W×H, centered at the position (x+mvx, y+mvy). Out(x+mvx, y+mvy, −1) 424 may comprise pixels from the noise reduced video picture Out(−1) 422 that may be shifted by the determined motion vectors mvx and mvy relative to the current video picture window In(x, y, 0).

The motion compensated noise detector (MCND) 404 may comprise suitable logic, circuitry, interface(s) and/or code that may be operable to receive the motion compensated, noise reduced reference window Out(x+mvx, y+mvy, −1) 424 from the ME and MC module 402 and the current video picture window In(x, y, 0). The MCND module 404 may determine a noise level for the current video picture window In(x, y, 0). The noise level may be sent to the processor 104 shown in FIG. 1, for example. Various parameters such as filter coefficients, threshold levels, and/or constants may be determined based on the determined noise level. The various filter coefficients, threshold levels, and/or constants may be utilized for noise reduction of the current video picture In(0). The noise level may be determined based on a determined difference between the motion compensated, noise reduced reference video picture window Out(x+mvx, y+mvy, −1) and the current window In(x, y, 0). Moreover, the MCND module 404 may be operable to determine which pixels or areas of pixels may be utilized to determine an average noise level for the current video picture In(0) and/or which pixels may be left out.

The motion compensated (MC) difference determination module 406 may comprise suitable logic, circuitry and/or code that may be operable to determine a motion metric value MM(x,y) 426 for luma pixel values in the current video picture. In this regard, the video pictures and/or windows of luma pixel data from the video pictures in consecutive temporal order may be denoted in the following manner.

$$\ldots P_{n-1}, P_n, P_{n+1} \ldots$$

Furthermore, a window of dimensions w*h centered at a pixel position (x,y) in the current video picture may be denoted $P_n$ and a window of dimensions w*h centered at a pixel (x+mvx, y+mvy) in the noise reduced reference picture may be denoted as $P_{n-1}'$. Pixels with horizontal and vertical coordinates of (x, y) in the window $P_n$ may be denoted by the following relationship:

$$P_n(x,y), x=0,1,\ldots, \text{width}-1; y=0,1,\ldots, \text{height}-1.$$

The luma part of the motion metric for a pixel $P_n(x,y)$ may be represented by the following relationship:

$$MM(x, y) = \frac{4 * \left( \sum_{(i,j) \text{ in the } w \times h \text{ neighbor of } (x,y)} |Diff_n(i, j)| \right)}{w * h},$$

where $$Diff_n(i,j) = |P_n(i,j) - P_{n-1}'(i+mvx, j+mvy)|,$$

where the quantities or variables herein may comprise integer values. The factor of 4 may be utilized to reach a specified numerical precision in numerical computation.

In this regard, $\text{Diff}_n(i,j)$ may determine a residue difference between pixels in the current video picture and pixels at a motion-aligned position in the noise reduced reference picture. The residue may comprise a value for a random noise level of a pixel at position (x,y) in the current window $P_n$. The variables mvx and mvy may be the motion vectors estimated by the ME and MC module 402 for the w*h window centered at the pixel position (x,y) in the current window $P_n$ and for the motion compensated, noise reduced reference window pixels in $P_{n-1}'$.

After performing motion compensation processing, for various pixels or areas of pixel data of the current window, the residue difference may comprise content information rather than random noise. This may be due to complicated motion and/or moving edge effects. In this regard, a portion of the samples of MM(x,y) may be excluded prior to determining an average noise level for a video picture.

The motion compensated (MC) moving edge gradient module 408 may comprise suitable logic, circuitry, interface (s) and/or code that may be operable to determine an edge gradient of $\text{Diff}_n(i,j)$ that may be determined for a window of dimensions w×h centered around a pixel at position (x,y). In this regard, if the determined edge gradient is too large or too small, a value for MM(x,y) 426 determined for the same window, may not be utilized when determining a mean noise level for a current video picture.

An exemplary motion compensated method for determining an edge gradient may comprise partitioning a window in a neighborhood of a current video picture of dimensions w*h centered around a pixel position (x, y). The window may be partitioned into three horizontal parts, one with the x-coordinates smaller than the center pixel x value, one with the x-coordinates the same as x, and the other with the x-coordinates larger than x, as described with respect to FIG. 3. Similarly, the window may be partitioned into three vertical parts, one with the y-coordinates smaller than the center pixel y value, one with the y-coordinates the same as y, and the other with the y-coordinates larger than y.

The edge gradient corresponding to a motion metric value MM(x,y) 426 may be determined based on $\text{Diff}_n(i,j)$ utilizing the following expressions:

$$\text{sum\_right} = \sum_{(i,j) \text{ in wxh neighbor, with } i>x} \text{Diff}_n(i, j)$$

$$\text{sum\_left} = \sum_{(i,j) \text{ in wxh neighbor, with } i<x} \text{Diff}_n(i, j)$$

$$\text{sum\_lower} = \sum_{(i,j) \text{ in wxh neighbor, with } j>y} \text{Diff}_n(i, j)$$

$$\text{sum\_upper} = \sum_{(i,j) \text{ in wxh neighbor, with } j<y} \text{Diff}_n(i, j)$$

$$dx = \text{sum\_right} - \text{sum\_left}$$

$$dy = \text{sum\_lower} - \text{sum\_upper}$$

$$\text{edge\_gradient} = \max(|dx|, |dy|)$$

In instances when a determined value of edge_gradient for the motion metric value MM(x,y) 426 may be larger than a specified threshold or smaller than a specified threshold, the value for MM(x,y) 426 may be excluded from samples that are utilized to determine the mean noise level for the current video picture.

The motion compensated (MC) moving content value module 410 may comprise suitable logic, circuitry, interface (s) and/or code that may be operable to determine, based on a signed difference value, when a window of current pixel data corresponding to a motion metric value MM(x,y) 426 may comprise content information. Motion metric values MM(x, y) 426 that may correspond to the window of current pixel data comprising content value may be excluded from samples that may be utilized to determine a mean noise level for a corresponding video picture. In various instances, the content information may be caused by DC shift, for example, when a shadow may pass over objects in an image. In other instances, the content information may be caused by complex motion of moving patterns for example. In this regard, content information may be determined based on evaluation of signed differences $\text{SDiff}_n(i,j)$ between a w*h current window and a w*h motion compensated reference window. The current window may be centered at a pixel position (x,y) and the motion compensated reference window may be centered at (x+mvx, y+mvy) based on the following expression:

$$\text{SDiff}_n(i,j) = P_n(i,j) - P_{n-1}'(i+mvx, j+mvy)$$

A value for identifying content may be determined based on the signed variables in the following expressions:

$$\text{Ssum\_right} = \sum_{(i,j) \text{ in wxh neighbor, with } i>x} \text{SDiff}_n(i, j)$$

$$\text{Ssum\_left} = \sum_{(i,j) \text{ in wxh neighbor, with } i<x} \text{SDiff}_n(i, j)$$

$$\text{Ssum\_lower} = \sum_{(i,j) \text{ in wxh neighbor, with } j>y} \text{SDiff}_n(i, j)$$

$$\text{Ssum\_upper} = \sum_{(i,j) \text{ in wxh neighbor, with } j<y} \text{SDiff}_n(i, j)$$

where $$\text{content\_value} = \max\begin{pmatrix} |\text{Ssum\_right}|, |\text{Ssum\_left}|, \\ |\text{Ssum\_lower}|, |\text{Ssum\_upper}| \end{pmatrix}$$

In instances when content_value of motion metric value MM(x,y) 426 may be larger than a specified threshold, MM(x,y) 426 may be excluded from samples of motion metric values that may be utilized to determine a mean noise level for the current video picture.

The noisy sample histogram (NSH) and accumulated noise level (ANL) module 412 may comprise suitable logic, circuitry, interface(s) and/or code that may be operable to determine which per pixel motion metric values may be utilized as samples of random noise for a specified video picture. The per pixel noise samples may be utilized to determine a mean noise level for the current video picture. In this regard, the NSH and ANL module 412 may exclude a motion metric value from a population of valid samples in instances when an edge gradient and/or content value that may be determined for a same pixel, may be outside of a specified range of acceptable values. Furthermore, the NSH and ANL module 412 may be operable to distribute MM(x,y) 426 values for a current video picture over a plurality of noise level ranges and may exclude various MM(x,y) 426 values from the mean noise calculation based on whether the MM(x,y) 426 values are outside of a specified range.

The noise level estimation module 414 may comprise suitable logic, circuitry, interface(s) and/or code that may be operable to collect valid noise samples from the NSH and ANL module 412 and determine a mean noise level value for the current video picture In(0) 420.

In operation, the ME and MC module 402 may receive the current video picture or a window from the current video picture In(x, y, 0) 420 and a previous motion compensated, video picture Out(−1) 422. The ME and MC module 402 may be operable to determine motion vectors that may enable aligning displaced pixels in the reference video picture Out(−1) 422 with corresponding pixels in the current video picture window In(x, y, 0) 420. The ME and MC module 402 may output the motion aligned reference window Out(x+mvx, y+mvy, −1). The MCND module 404 may be operable to receive the current video picture window In(x, y, 0) and the motion aligned reference picture window Out(x+mvx, y+mvy, −1) and may determine a motion metric value MM(x, y) 426, an edge gradient value 428 and a content value 430. The NSH and ANL module 412 may be operable to receive the motion metric values MM(x,y) 426, the edge gradient values 428 and the content values 430 from the MCND module 404 and may exclude the motion metric value if it falls outside of a specified range.

In addition, the NSH and ANL module 412 may be operable to exclude motion metric values for which a corresponding edge gradient and/or content value falls outside of a specified range. The process may be repeated for other pixels within the current video picture In(0) 420. The NSH and ANL module 412 may determine which noise samples or motion metric values are valid and may be utilized to determine a mean noise level 421 for the current video picture In(0) 420. The NSH and ANL module 412 may accumulate MM(x,y) 426 samples for the current video picture. The NSH and ANL module 412 may associate the MM(x,y) 426 samples with one or more noise level ranges and may send the accumulated samples to the noise level estimation module 414. The noise level estimation module 414 may receive the valid noise samples from the NSH and ANL module 412 and may determine a mean noise level. The determined mean noise level 421 may be communicated to the processor 104, as described with respect to FIG. 1, for example. The processor 104 may determine parameters, thresholds and/or constants that may be utilized to reduce noise in the current video picture In(x, y, 0).

Figure 5:
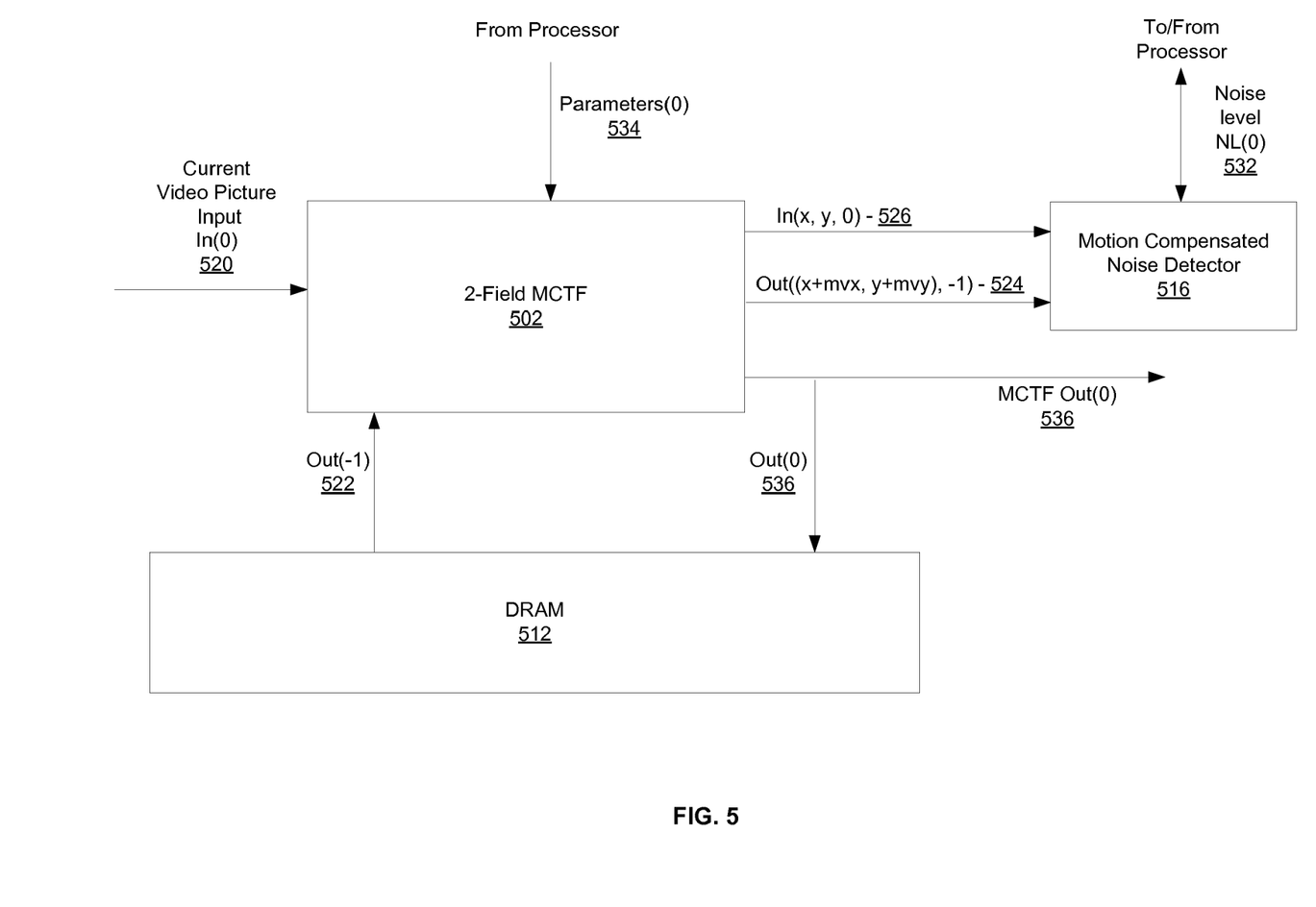
FIG. 5 is a block diagram illustrating motion compensated noise detector configured to share motion estimation resources with a motion compensated temporal filter, in accordance with an embodiment of the invention.

FIG. 5 is a block diagram illustrating motion compensated noise detector configured to share motion estimation resources with a motion compensated temporal filter, in accordance with an embodiment of the invention. Referring to FIG. 5, there is shown a motion compensated temporal filter (MCTF) 502, a DRAM 512, a motion compensated noise detector (MCND) 516. In addition, there is shown input and output data comprising current video picture input In(0) 520, a current input window In(x, y, 0) 526, current MCTF output Out(0), a previous motion compensated MCTF output window Out(x=mvx, y+mvy, −1) 524, previous MCTF output Out(−1) 522, current noise level NL(0) 532 and current parameters, parameters(0).

The motion compensated noise detector (MCND) 516 may be similar or substantially the same as the noise level determination system 400 described with respect to FIG. 4. In this regard, the MCND 516 may comprise the motion compensated noise detector (MCND) 404, the noisy sample histogram (NSH), the accumulated noise level (ANL) module 412, the noise level estimation module 414, the motion compensated (MC) difference determination module 406, the motion compensated (MC) moving edge gradient module 408 and the motion compensated (MC) moving content value module 410.

The two field motion compensated temporal filter (MCTF) 502 may comprise suitable logic, circuitry, interface(s) and/or code that may be operable to perform motion estimation and/or motion compensation and reduce noise from one or more video pictures. For example, the video pictures may be interlaced video fields of the same polarity or progressive video frames. The noise may comprise analog noise that may be introduced into pixel data via a video distribution channel. For example, the noise may occur randomly over time and at different pixel and/or sub-pixel positions within a sequence of video pictures. The MCTF 502 may be operable to reduce the noise in pixel data of a current video picture In(0) 520. In various embodiments of the invention, the MCTF 502 may comprise an infinite impulse response (IIR) filter that may utilize noise reduced pixel data from a motion compensated MCTF output of the same polarity Out(−1) 522 and pixel data from the current video picture In(0) 502. Moreover, the MCTF 502 may receive parameters, thresholds and/or constants for example, parameters(0) 534, from the processor 104, described with respect to FIG. 1, that may be utilized for reducing the noise of the current video picture In(0) 520. Although the MCTF 502 shown in FIG. 5 is a two field motion compensated temporal filter, the invention is not so limited. For example, various embodiments of the invention may comprise a filter that may utilize one or more other previous and/or future fields to filter out noise.

The MCTF 502 may comprise suitable logic, circuitry, interface(s) and/or code that may be operable to perform motion estimation and/or motion compensation. In this regard, the MCTF 502 may be operable to receive the current video picture In(0) 520 and a previously noise reduced output video picture Out(−1) 522 of the same polarity. The MCTF 502 may determine a w×h window centered around the pixel position (x, y) in the current video picture In(0) 520. The MCTF 502 may search for a matching window of pixel data at various pixel positions in the previous video picture Out(−1) 522. The MCTF 502 may determine a best matching window Out(x+mvx, y+mvy, −1) 524 of dimensions w×h centered at the pixel position (x+mvx, y+mvy) in the previous video picture Out(−1) 522. The direction and/or degree of motion between the current video picture In(0) 520 and the previous picture of the same polarity Out(−1) 522 may be represented by the motion vectors mvx and mvy. In this regard, the MCTF 502 may determine motion vectors by displacing the window at various positions within a specified range of the previous video picture and comparing the windows of pixel data at the various positions. If a match is determined, motion vectors may be determined based on the displacement of the window at the position of the match.

In various embodiments of the invention, the motion estimation and motion compensation process may be performed by the MCTF 502 and the motion compensated data may be sent to the MCND 516. In this regard, the MCND 516 may not need to perform motion estimation and/or motion compensation. For example, when a current pixel at position (x,y) may be processed in the MCTF 502, a w×h window centered at pixel position (x, y) of the current video picture In(0) and a w×h motion compensated window centered at location (x+mvx, y+mvy) in the previous feedback picture out(−1) may be passed to the MCND 516 in order to determine a noise level in the current window. In this regard, the current window In(x, y, 0) and the motion compensated previous window Out(x+mvx, y+mvy, −1) may be sent to the MCND 516 so that a noise level for the current video picture In(0) 520 may be determined.

The dynamic random access memory (DRAM) 512 may comprise suitable logic, circuitry, interface(s) and/or code that may be operable to store a plurality of video pictures. The DRAM 512 may be communicatively coupled to the MCTF 502. The DRAM 512 may be operable to store output video pictures from the MCTF 502. The DRAM 512 may be operable to write one or more video pictures to the MCTF 502 and may be operable to receive one or more video pictures from the MCTF.

In operation, the MCTF 502 may receive a current video picture In(0) 520 and may receive a previous MCTF 502 output Out(−1) 522 from the DRAM 512. The MCTF may perform motion estimation and motion searches and determine motion vectors for motion between the current and previous video pictures. The MCTF 502 may send windows of pixel data from the current video picture In(x, y, 0) 526 and motion compensated windows from the previous output Out (x+mvx, y+mvy, −1) the MCND 516. The MCND 516 may determine a motion metric value MM(x) 426, a moving edge gradient 408 and moving content value 410 described with respect to FIG. 4, to the NSH and ANL module 412. The NSH and ANL module 412 may determine which MM(y) 426 values may be utilized for noise samples and may send the noise samples to the noise level estimation module 414. The noise level estimation module 414 may determine a noise level for the current video picture In(0) 520 and may send the noise level 432 to the processor 104 described with respect to FIG. 1. The processor 104 may determine and/or select parameters that may be utilized by the MCTF 502 for reducing noise in the current video picture In(0) 520 and may send the parameters(0) 534 to the MCTF 502. The MCTF 502 may filter noise from the current video picture In(0) 520 and may send the current output Out(0) 536 to the DRAM 512 and/or another processing unit.

Figure 6:
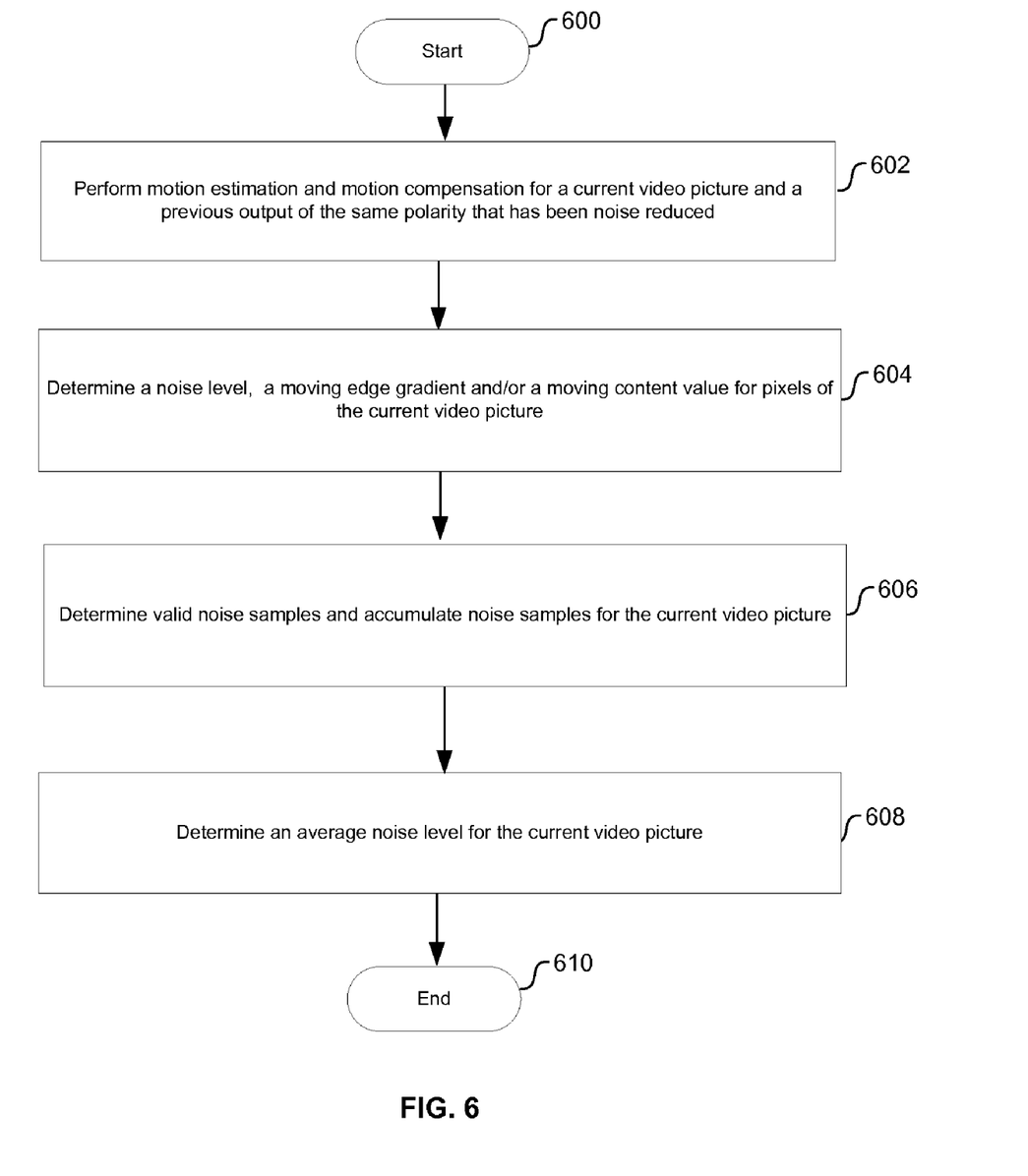
FIG. 6 illustrates exemplary steps for motion compensated noise detection, in accordance with an embodiment of the invention.

FIG. 6 illustrates exemplary steps for motion compensated noise detection, in accordance with an embodiment of the invention. Referring to FIG. 6, the exemplary steps may begin with start step 600. In step 602, the MCTF 502 or the motion estimation and/or motion compensation module 402 may perform motion estimation and/or motion compensation for motion between a current video picture In(0) 520 and a previous output of the same polarity Out(−1) 522 that has been noise reduced. In step 604, a noise level, a moving edge gradient and/or a moving content value for pixels of the current video picture In(0) 520 may be determined by the MCND 404 or 516. In step 606, valid noise samples may be determined and accumulated by the NSH and ANL module 412 for the current video picture In(0) 502. In step 608, an average noise level NL(0) may be determined for the current video picture In(0) 520. Step 610 may be the end of the exemplary steps.

In an embodiment of the invention, one or more processors and/or circuits in a video processing system may be utilized to read two consecutive same polarity video pictures that may comprise video pixel data and/or progressive video data. The two consecutive same polarity video pictures may comprise a current video picture and motion compensated, noise reduced reference video picture. A noise level for pixel data in the current video picture may be determined based on the current video picture and motion compensated pixel data of the noise reduced reference video picture. A noise level for the current video picture may be determined based on the determined noise level for the pixel data from the current video picture. Motion may be estimated between the two consecutive same polarity video pictures. The estimated motion may be performed by a motion compensation noise detector, for example, by the motion estimation and motion compensation module 402 shown in FIG. 4 and/or by a motion compensated temporal filter, for example, the MCTF 502 shown in FIG. 5. Furthermore, for a plurality of pixels from the current video picture, a noise level sample may be determined. The noise level sample may be determined based on a window of pixel data from the current video picture and a window of pixel data from the motion compensated, noise reduced reference video picture. A valid noise sample for the current video picture may be determined based on one or more of a moving edge gradient value, a moving content value and a determined range of noise level values. Noise level samples may be accumulated for a plurality of pixels within the current video picture and/or a noise level may be determined for the current video picture. The video pictures comprise interlaced video pixel data and/or progressive video data.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for motion compensated noise level detection and measurement.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:

performing by one or more processors one or more circuits, or any combination thereof in a video processing system:

reading two consecutive same polarity video pictures;

determining a noise level for pixel data from a current video picture based on motion compensated pixel data of a noise reduced reference video picture utilizing one or both of said two consecutive same polarity video pictures;

determining, for a plurality of pixels from said current video picture, a noise level sample based on a window of pixel data from said current video picture and a motion compensated window of pixel data from said noise reduced reference video picture, the noise level comprising a plurality of per-pixel samples of random noise;

determining a mean noise level for the current video picture based on the noise level sample; and determining a noise level for said current video picture based on said determined noise level for said pixel data from said current video picture and the mean noise level.

2. The method according to claim 1, comprising estimating motion and/or motion vectors between said two consecutive same polarity video pictures.

3. The method according to claim 1, comprising estimating motion and/or motion vectors between said two consecutive same polarity video pictures by a motion compensated noise detector and/or a motion compensated temporal filter.

4. The method according to claim 1, comprising determining the noise sample for said current video picture based on a moving edge gradient value.

5. The method according to claim 1, comprising determining the noise sample for said current video picture based on a moving content value.

6. The method according to claim 1, comprising determining the noise sample for said current video picture based on one or more determined ranges of noise level values.

7. The method according to claim 1, comprising accumulating noise level samples for a plurality of pixels within said current video picture.

8. The method according to claim 1, comprising determining the noise level for said current video picture.

9. The method according to claim 1, wherein said read consecutive video pictures comprise interlaced video pixel data and/or progressive video data.

10. A system for processing video data, the system comprising:

one or more circuits for use in a video processing system, wherein said one or more circuits are operable to:

read two consecutive same polarity video pictures;

determine a noise level for pixel data from a current video picture based on motion compensated pixel data of a noise reduced reference video picture utilizing one or both of said two consecutive same polarity video pictures;

determine, for a plurality of pixels from said current video picture, a noise level sample based on a window of pixel data from said current video picture and a motion compensated window of pixel data from said noise reduced reference video picture, the noise level comprising a plurality of per-pixel samples of random noise;

determine a mean noise level for the current video picture based on the noise level sample; and determine a noise level for said current video picture based on said determined noise level for said pixel data from said current video picture and the mean noise level.

11. The system according to claim 10, wherein said one or more circuits are operable to estimate motion and/or motion vectors between said two consecutive same polarity video pictures.

12. The system according to claim 10, wherein said one or more circuits comprises a motion compensated noise detector and/or a motion compensated temporal filter, and said one or more circuits are operable to estimate motion and/or motion vectors between said two consecutive same polarity video pictures by said motion compensated noise detector and/or said motion compensated temporal filter.

13. The system according to claim 10, wherein said one or more circuits are operable to determine the noise sample for said current video picture based on a moving edge gradient value.

14. The system according to claim 10, wherein said one or more circuits are operable to determine the noise sample for said current video picture based on a moving content value.

15. The system according to claim 10, wherein said one or more circuits are operable to determine the noise sample for said current video picture based on one or more determined ranges of noise level values.

16. The system according to claim 10, wherein said one or more circuits are operable to accumulate noise level samples for a plurality of pixels within said current video picture.

17. The system according to claim 10, wherein said one or more circuits are operable to determine the noise level for said current video picture.

18. The system according to claim 10, wherein said read consecutive video pictures comprise interlaced video pixel data and/or progressive video data.

* * * * *